UNITED STATES PATENT OFFICE.

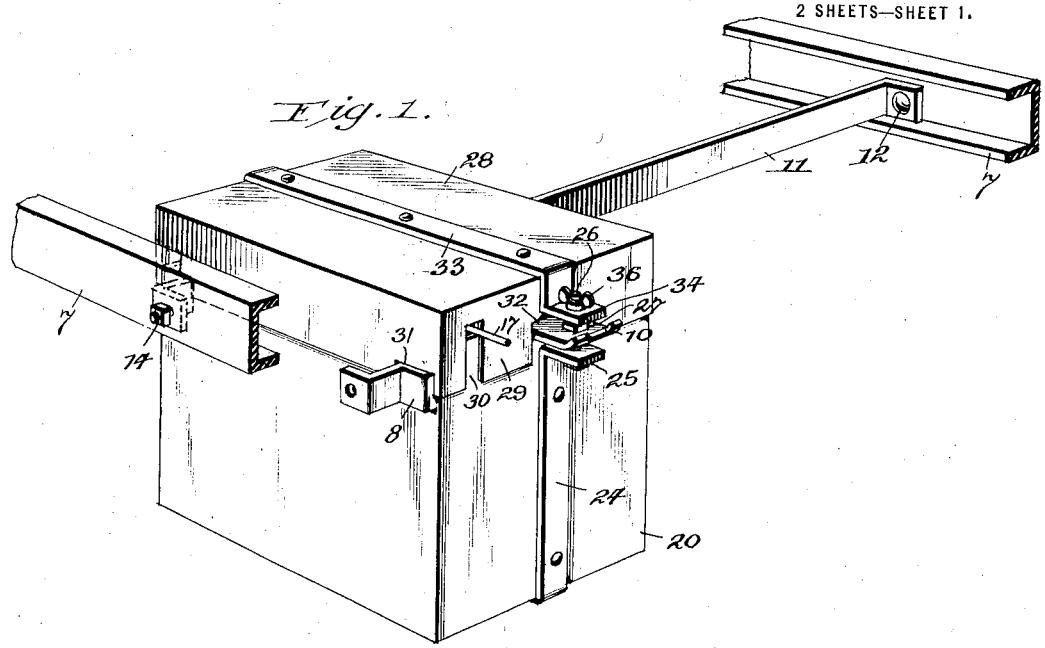

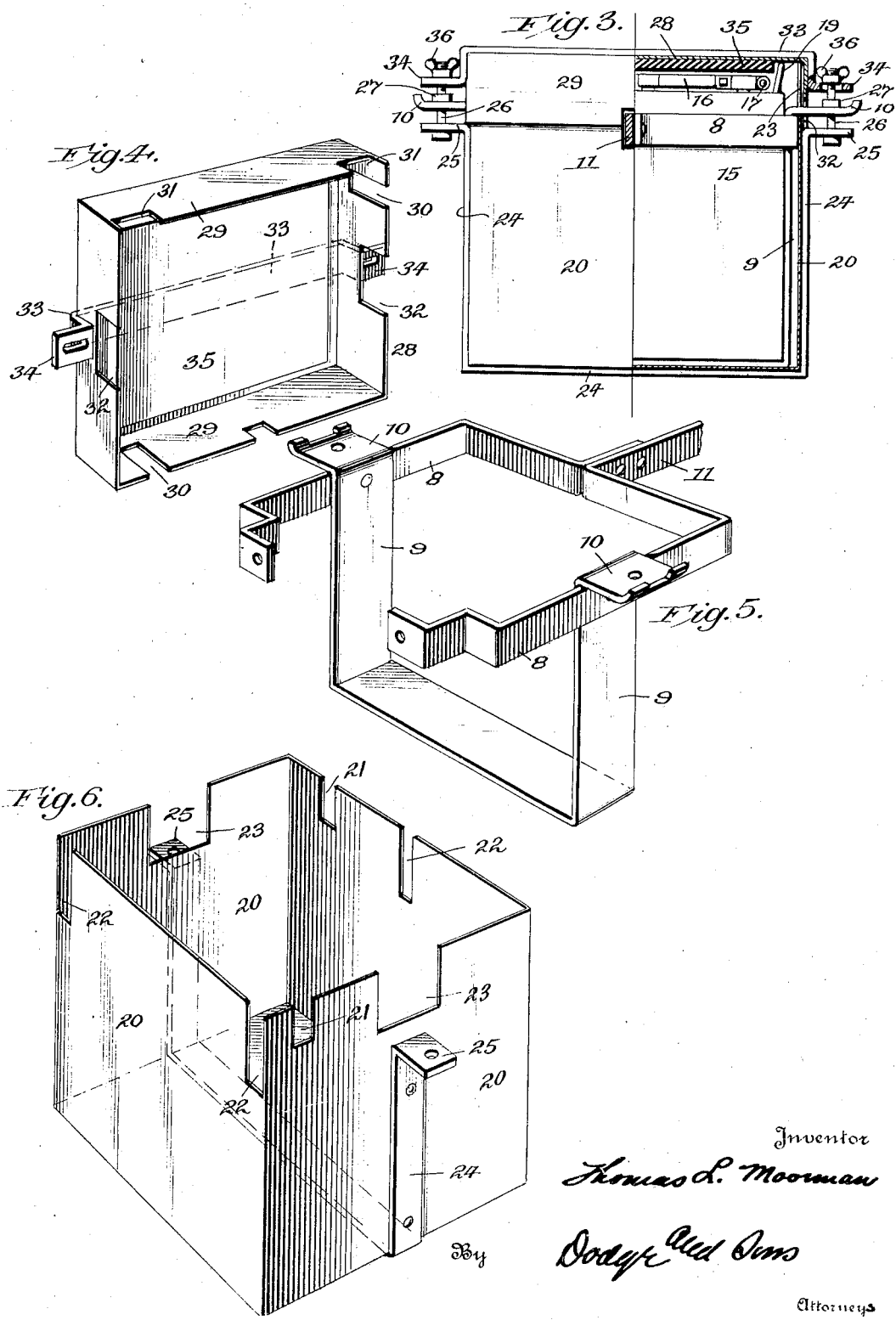
T. L. MOORMAN.
BATTERY BOX.
APPLICATION FILED FEB. 27, 1920.
1,338,690.
Patented May 4, 1920.
2 SHEETS—SHEET 2.

THOMAS L. MOORMAN, OF FARMVILLE, VIRGINIA.

BATTERY-BOX.

1,338,690.	Specification of Letters Patent.	Patented May 4, 1920.

Application filed February 27, 1920. Serial No. 361,900.

*To all whom it may concern:*

Be it known that I, THOMAS L. MOORMAN, a citizen of the United States, residing at Farmville, in the county of Prince Edward and State of Virginia, have invented certain new and useful Improvements in Battery-Boxes, of which the following is a specification.

This invention relates to battery-boxes and particularly to a protective casing directly applicable to the storage battery used as a part of the starting and lighting equipment of Ford automobiles.

In this car the battery is mounted in an open frame constructed of bar stock, the frame extending between the side bars of the chassis. The top of the battery is below the floor of the car and entirely exposed so that the filling caps and terminals soon become caked with mud. This mud leads to leakage losses, and also to injury of the electrolyte by particles of chemically active matter which enter the filling openings whenever water is added to the electrolyte. Furthermore, the presence of this coating of mud makes the inspection and proper maintenance of the battery a very unpleasant task.

The difficulty obviously could be overcome by substituting a battery support, formed with a proper inclosing box, hold-down clamps and cover, but such solution of the difficulty in existing cars is expensive and troublesome.

The present invention provides a cover, and in its preferred form a two-part casing, which, without requiring change in the standard battery support, meets the requirements of a casing applicable to this make of car regardless of the body style, and offers the same convenience in use as would the conventional type of battery box.

I secure this result by removing the battery hold-down clips now used to clamp the battery in the frame and substituting for them a cover which engages the clamp handles on the battery and performs the holding-down function. This cover extends over the entire top of the battery and has a skirt which extends far enough down the sides of the battery to protect the top from mud, water, and dust. The skirt is notched to clear the battery frame and leads, and the cover has an insulated central lining covering the area where contact with the leads is possible. If complete housing of the battery is desired, I provide in addition to the cover a lower box section notched at its top to clear the battery frame and leads. This lower section has lugs through which the hold-down bolts for the top are passed, and when once in place need never be removed even to remove the battery.

The invention is illustrated in the accompanying drawings, in which:

Figure 1 is a perspective view showing the complete casing in place;

Fig. 2 is a plan view showing the lower section of the casing in place, and the top removed;

Fig. 3 is a half section and half elevation of the complete casing, the battery and its supporting frame being shown in elevation;

Fig. 4 is a perspective view of the cover;

Fig. 5 is a perspective view of the battery frame forming part of the standard equipment of Ford cars; and Fig. 6 is a perspective view of the lower section of the casing.

Portions of the side bars of the chassis are shown at 7. The battery frame now furnished as a part of the car comprises the rectangular yoke 8, the supporting strap 9 terminating in the lugs 10, and the cross bar 11. This frame is bolted to the right side bar at 12 and to the left side bar at 13 and 14. (See Figs. 1, 2 and 5). The battery is indicated generally by the numeral 15, and has as usual the connectors 16, leads 17, filling plugs 18, and combined handles and hold-down brackets 19 which project above its top. In the car as furnished, sheet metal hold-down clips (not shown) are held by bolts passing through the lugs 10 and bearing on brackets 19.

The lower part of the casing forming part of my invention is shown at 20. This lower part while not absolutely indispensable is desirable and I prefer to use it. The part 20 is a rectangular box of sheet metal, notched at 21 to clear the leads 17, at 22 to clear the battery frame, and at 23 to clear lugs 10. When in place it extends approximately to the top edge of the battery 15. It is held by a stirrup 24 of bar stock which has lugs 25 at its ends. A pair of bolts 26, longer than the hold-down bolts furnished with the car, are passed through the lugs 25 and 10, and nuts 27 are put in place to retain the lower casing section while the cover is removed.

Careful examination of Fig. 2 will disclose the fact that at the left of that figure, casing section 20 passes between yoke 8 and battery 15, while at the right it is outside the yoke. This serves two useful purposes. It allows the box to fit, even if the yoke 8 should vary considerably from standard dimensions, and it avoids interference between the lower flange of the left side bar 7 and the casing 20. In some cases the relative open projection of the flange on bar 7 is much greater than is shown in the drawings.

The cover 28 has a depending flange or skirt 29 which fits over the lower part 20 of the casing, and is notched at 30 to clear the leads 17, at 31 to clear the battery frame and at 32 to clear the lugs 10. (See Fig. 4). A stirrup 33 is riveted to the top of the box and has lugs 34 at its ends to receive the ends of the bolts 26. A liner 35 of wood or other insulating material, is fixed in the middle of the cover 28 to avoid any risk of short circuiting the battery by accidental contact of the lower face of the cover with the leads. This liner also protects the cover from corrosion by the electrolyte, should any splashing occur through the gas vent in the filling plugs.

When in place the cover rests directly on the top of the combined handles and hold-down brackets 19, the points of contact being directly under the stirrup 33. Wing-nuts 36 on bolts 26 serve to clamp the cover down, so as to hold the battery firmly in place.

The skirt 29 of the cover passes outside the lower section 20 all around. Obviously it may be used without the lower section 20, since the protection of the top of the battery is the most important feature. When used with the lower section 20 the skirt 29 need not be made so deep. A practical cover can then be made with a skirt 29 so shallow that the notches 31 and 32 are practically or entirely eliminated. While the deep skirt gives better protection against dust, I wish to avoid any implication that it is essential when the lower section 20 is used.

Other minor changes are obviously possible without departure from the spirit of the invention.

Having thus described my invention what I claim is:—

1. A protector for an exposed storage battery having hold-down brackets extending above its top, and mounted in an open frame provided with hold-down lugs, said protector comprising in combination a cover adapted to rest upon said hold-down brackets and having a depending flange adapted to extend below and to embrace the top edge of the battery; and lugs on said cover capable of being connected by releasable stressed connectors to the hold-down lugs on said frame.

2. A protector for an exposed storage battery having hold-down brackets extending above its top, and mounted in an open frame provided with hold-down lugs, said protector comprising in combination a cover adapted to rest upon said hold-down brackets, and having a depending notched flange adapted to extend below and to embrace the top edge of the battery; a liner of insulating material mounted on the lower face of said cover above the leads of the battery; and lugs on said cover capable of being connected by releasable stressed connectors to the hold-down lugs on said frame.

3. The combination of a battery-supporting frame; a battery mounted in said frame; a lower casing section housing the bottom and sides of said battery, abutting against said frame, and having retaining lugs; a cover section bearing on said battery, fitting said lower casing section and having retaining lugs; and threaded connectors connecting the retaining lugs on the cover section with the retaining lugs on the lower casing section and serving to draw the same together to clamp said battery in said frame.

4. The combination of a battery-supporting frame having hold-down lugs; a battery mounted in said frame and having hold-down brackets extending above its top; a lower casing section housing the bottom and sides of said battery, abutting against said frame, and having retaining lugs below the hold-down lugs of said frame; a cover section bearing on said hold-down brackets, fitting said lower casing section and having retaining lugs above said hold-down lugs; and headed threaded connectors passing through said retaining and hold-down lugs and each provided with two nuts, one serving to hold said lower section in fixed relation to said frame, and the other serving to draw said lower section and said cover together to clamp said battery in said frame.

In testimony whereof I have signed my name to this specification.

THOMAS L. MOORMAN.